W. A. DICK.
DYNAMO ELECTRIC MACHINE.
APPLICATION FILED DEC. 31, 1908.
992,943.
Patented May 23, 1911.
4 SHEETS—SHEET 4.
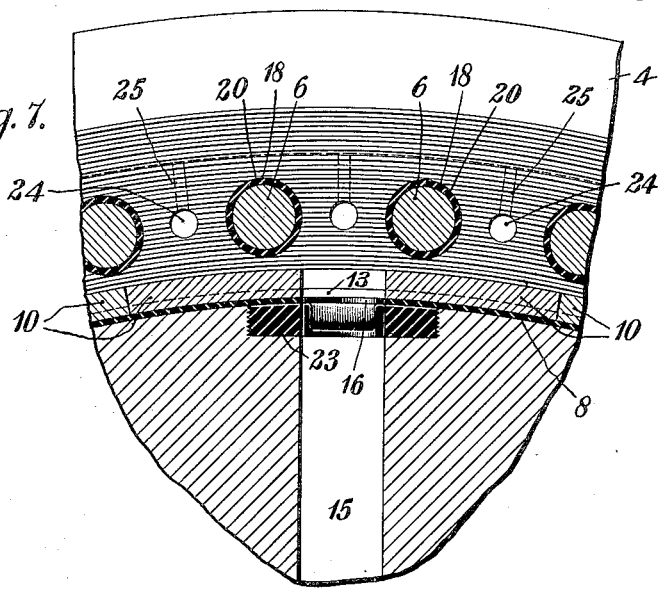
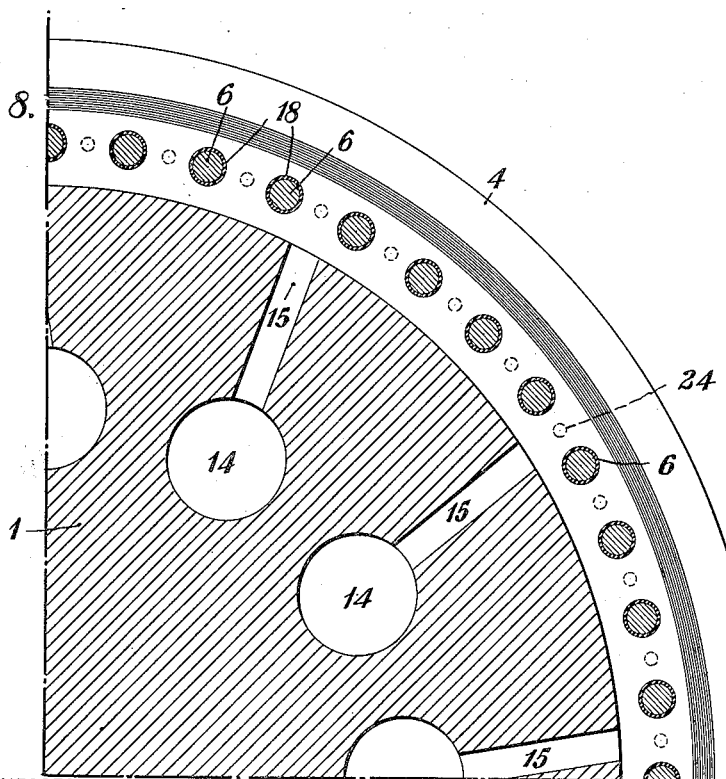

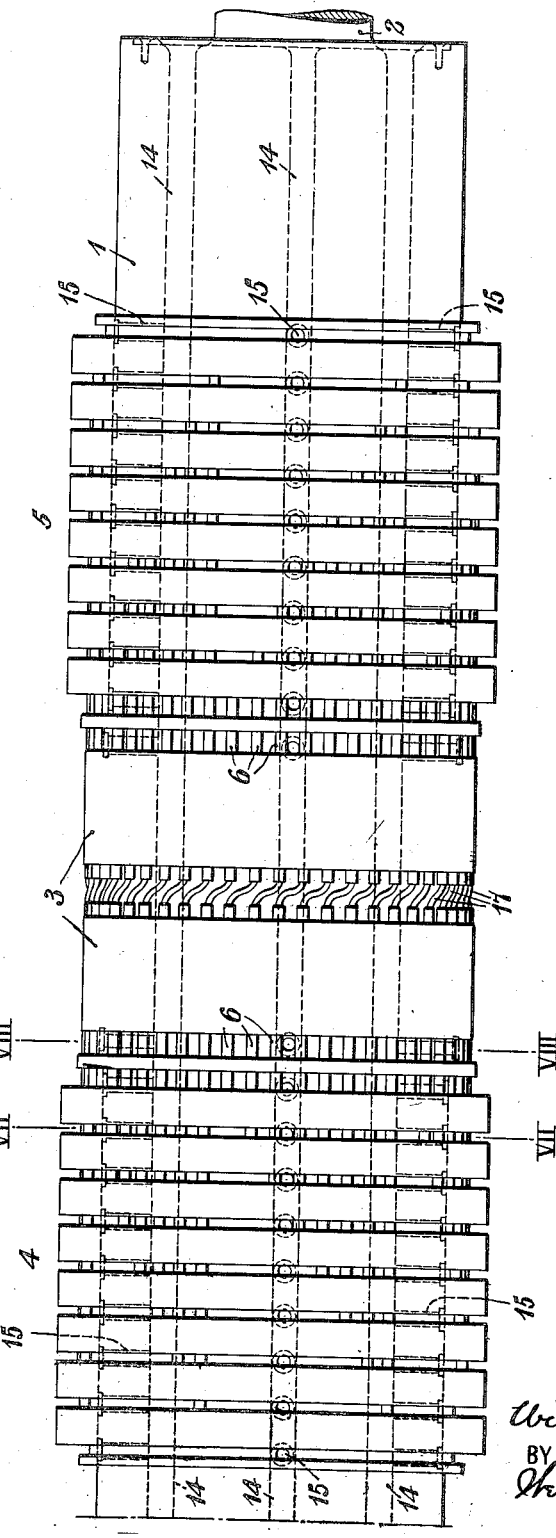

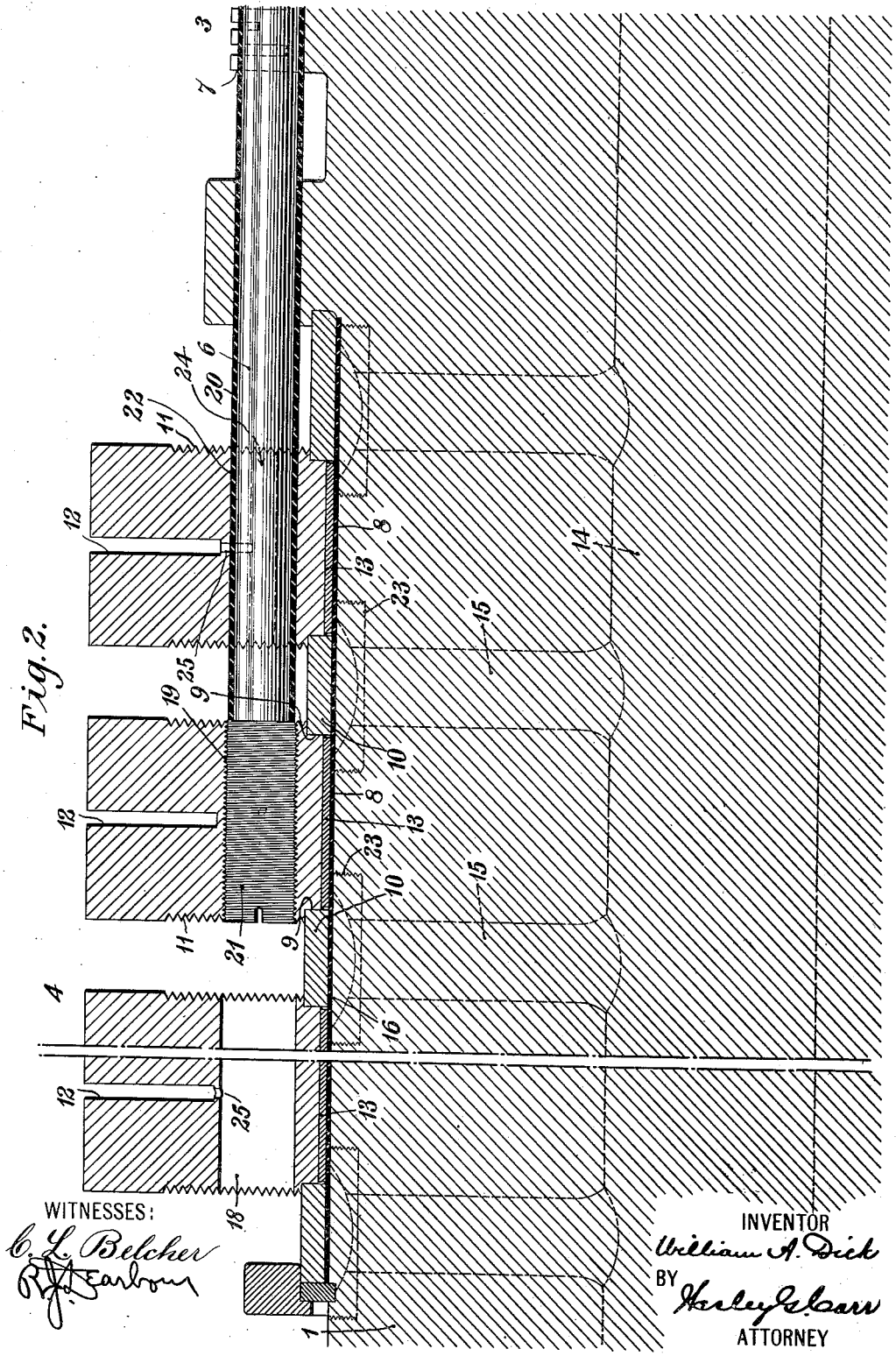

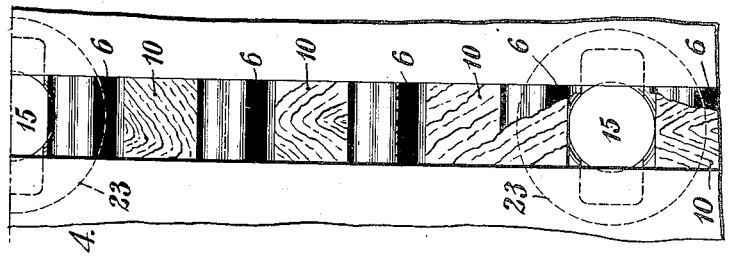
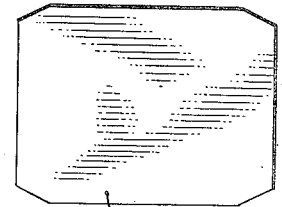
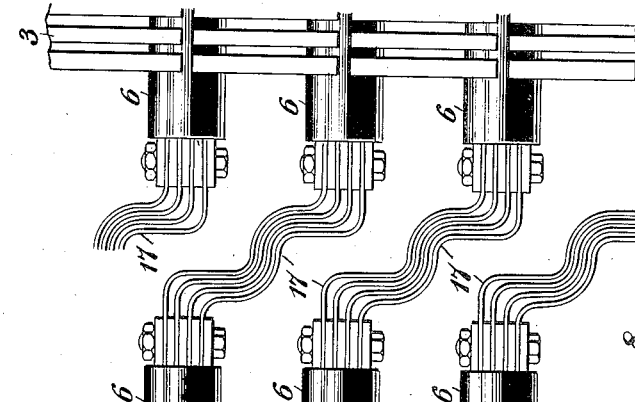
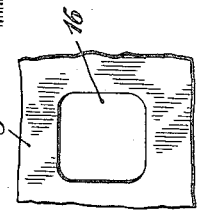
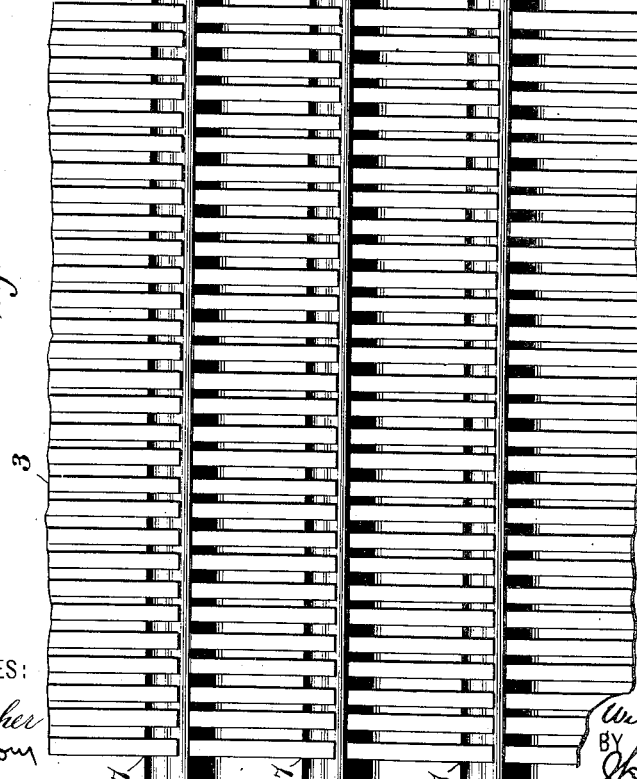

UNITED STATES PATENT OFFICE.

WILLIAM A. DICK, OF PITTSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

992,943.　　　Specification of Letters Patent.　Patented May 23, 1911.

Application filed December 31, 1908. Serial No. 470,204.

*To all whom it may concern:*

Be it known that I, WILLIAM A. DICK, a citizen of the United States, and a resident of Pittsburg, in the county of Allegheny and State of Pennsylvania, have invented a new and useful Improvement in Dynamo-Electric Machines, of which the following is a specification.

My invention relates to dynamo-electric machines and it has special reference to the armatures or rotating parts of unipolar machines having a relatively large number of collector rings.

The object of my invention is to provide an improved armature structure for machines of the class above indicated, whereby an excellent electrical connection between the armature conductors and the collector rings may be insured without interfering with the expansion and contraction of the rods or bars constituting said conductors.

Other structural improvements will be hereinafter pointed out.

The armatures pertaining to unipolar machines of large size usually comprise cylindrical core members having annular projections near their middle points and two sets of collector rings mounted on the core members and insulated therefrom, said rings being connected by conducting bars of considerable length that extend through slots in the annular projections.

It has been my aim to overcome the troubles usually incident to the expansion and contraction of the above mentioned armature conductors by dividing each conductor into two offset parts and connecting such parts by a flexible conducting section, and to facilitate the cooling of the parts which are electrically and magnetically active without weakening the insulation between the collector rings and the portion of the core on which they are mounted.

Figure 1 of the accompanying drawings is an elevation of an unipolar armature constructed in accordance with my invention. Fig. 2 is a longitudinal section and Figs. 3, 4, 5 and 6 are detail views, on a larger scale, of portions of the structure shown in Fig. 1. Figs. 7 and 8 are sectional views taken, respectively, on the lines VII—VII and VIII—VIII of Fig. 1.

Referring to the drawings, the armature here illustrated comprises a magnetizable core member 1 having shaft projections 2 at its ends and annular projections 3 near its middle point, collector rings, which are divided into two sets 4 and 5, and armature conductors 6 which connect corresponding rings of each set and extend through slots 7 in the annular projections 3.

The collector rings 4 and 5 are mounted upon the core member 1 which is first provided with an insulating cylinder or wrapping 8. Each of the rings 4 and 5 is undercut to provide annular notches 9 at its inner edges to receive the ends of spacing blocks 10 of wood, or other insulating material, which are disposed between the adjacent collector rings as ring segments to space the collector rings apart. Each collector ring is further provided with annular saw-tooth projections 11 and slots 12 which improve the ventilation of the ring by increasing its radiating surface.

In order to hold the collector rings 4 and 5 firmly in position at relatively high speeds and temperatures, when they are materially increased in size by reason of the expansion of the metal, resilient seats are provided by means of a plurality of plates 13 (see Fig. 6) which are preferably constructed of spring steel and are assembled directly under the rings to lie end to end and thus form a segmental ring, the plates being sprung to conform to the curvature of the core member 1 and being held in such position by clamping rings (not shown), or by other suitable means, while the collector rings are being shrunk in position.

When steel or brass collector rings of large diameter are shrunk upon a cylinder, such as the core member 1, the expansion of the rings will either be sufficient to make them loose on the cylinder or else the elastic limit of the rings will be passed by reason of the high operating speeds of the machine and the expansion of the core member when the temperature of both parts is raised to a relatively high value, such as is reached in the operation of dynamo-electric machines of the character described. By the use of the steel plates 13, the rings are permitted to expand faster than the core member without becoming loose, since the plates tend to straighten themselves and thus serve as resilient seats for the collectors.

The core member 1 is provided with a plurality of longitudinal holes 14, for purposes of ventilation, which communicate with radial passages 15, terminating at the surface of the core member, between the collector rings. The segmental rings 10 are interrupted at the mouths of the passages 15 and holes 16 (see Fig. 5) are cut through the insulating cylinder or wrapping 8 so that air may be forced outwardly through the passages and between the rings by the centrifugal action exerted when the machine is in operation, cool air being taken in through the holes 14, at the ends of the core member.

Each of the armature conductors 6 is divided into two parts which are offset and are joined together by a flexible connector 17 that lies between the annular projections 3 of the core member and comprises a plurality of wires or strips. The arrangement of parts is such that longitudinal holes 18 in the rings and the slots 7 in the projections 3 are in alinement, the offset portions of each armature conductor being respectively located in one of the slots 7 of one projection and in the next adjacent slot in the other projection. The outer ends of the conductors, which are cylindrical rods or bars, are somewhat enlarged and are each screw-threaded to engage a tapped hole 19 in the collector ring to which it is connected. Each rod is insulated from all of the rings except that to which it is connected and is insulated from the core member by means of an insulating tube 20 which is fitted over the rod and the outside diameter of which is slightly less than the pitch diameter of the screw-threaded enlargement 21.

While all of the collector rings are provided with the same number of holes, the size of each hole will depend upon its position relative to the armature conductor which is to be assembled in alinement with it. For example, referring to Fig. 2, the diameter of the hole 18 is of sufficient size to permit enlargement 21 to pass through it, while the hole 19 is tapped to receive the enlargement 21 and a corresponding hole 22 in the next adjacent ring is adapted to receive the insulating tube 20, through which the body of the conductor extends.

The mouths of the passages 15 are counter-sunk and are tapped to receive insulating washers or collars 23 for the purpose of increasing the surface leakage distance between the collector rings and the armature core, which parts would otherwise be brought close together, adjacent to the holes 16 in the insulating cylinder 8.

The conductors 6 are divided into a plurality of groups, each group comprising as many conductors as there are collector rings in each set, the outer ring of one set being connected to the inner ring of the other set, the next to the outer ring of one set being connected to the next to the inner ring of the other set, and so on, corresponding rings of the sets from left to right being connected together in each case. It will be observed that, by reason of the arrangement just stated, the outer rings of the sets are provided with a great many empty holes through which the conductors are thrust during the assembling process while all of the holes in the inner rings are occupied. Consequently, the temperature of the inner rings would be largely increased over that of the outer rings except for a plurality of holes 24 which are parallel to the holes 22 and form longitudinal passages to the annular slots 12. The holes 18, in which no conductors are located, communicate with the slots 12 by means of radial holes 25. Since the enlargements 21 are screw-threaded into the holes 19, a good electrical connection is established between the two parts, and, since the armature conductors are divided into offset parts and are joined by flexible connectors, the rods are free to expand without displacing the collector rings or impairing the electrical connections at their ends.

Since structural modifications may be effected within the spirit and scope of my invention, I desire that only such limitations shall be imposed as are indicated in the appended claims.

I claim as my invention:

1. An armature for unipolar machines having two sets of collector rings and armature conductors between said sets of rings, each of said conductors comprising two circumferentially offset parts and a multistrand connector between the adjacent ends of said parts.

2. An armature for unipolar machines having sets of collector rings, and armature conductors between said sets of rings, said conductors being divided into offset parts between the sets of rings, and flexible connectors between said parts.

3. A rotatable member for dynamo-electric machines comprising a metal cylinder having longitudinal passages and branching radial passages having enlarged outer ends, and insulating washers seated in said enlarged outer ends.

4. A rotatable member for dynamo-electric machines comprising a metal cylinder having longitudinal passages and radial holes between said passages and the surface of the cylinder, current-conducting parts mounted on and insulated from the cylinder, and insulating washers seated in the mouths of said holes.

5. A rotatable member for dynamo-electric machines comprising a metal cylinder having radial ventilating passages, a sleeve of insulating material fitted over the cylinder and having holes to register with said radial passages, collector rings mounted on the insulating sleeve, and insulating washers seated in the mouths of the radial passages.

6. A rotor for unipolar dynamo-electric machines comprising a cylindrical core member having a pair of annular projections near its middle point, two groups of collector rings disposed on the surface of the core member adjacent to the projections and insulated therefrom, conductors extending through the annular projections and joining corresponding rings of the two groups, and flexible sections interposed in the conductors between the two annular projections.

7. A rotor for unipolar dynamo-electric machines comprising a cylindrical core member having two groups of collector rings disposed on its surface and insulated therefrom, longitudinal passages and radial holes or passages terminating at the surface of the core member between the rings, insulating washers seated in the mouths of the passages, said passages being counter-sunk to receive the washers.

In testimony whereof, I have hereunto subscribed my name this 21st day of December, 1908.

WILLIAM A. DICK.

Witnesses:
M. N. BLAKEMORE,
BIRNEY HINES.